Feb. 20, 1923.
G. J. VONDRACEK.
VENTILATED AUTOMOBILE WINDSHIELD.
FILED AUG. 15, 1922.
1,445,732.
3 SHEETS—SHEET 1.
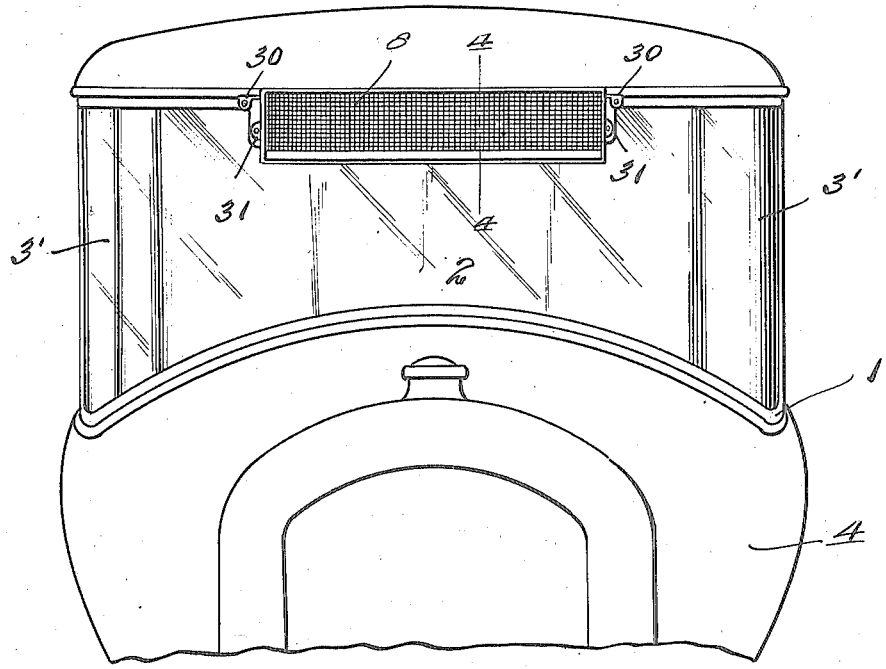
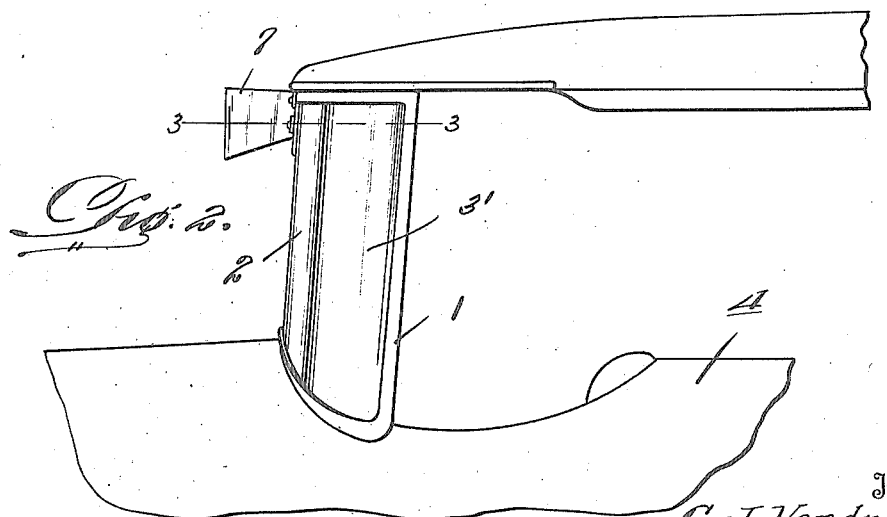

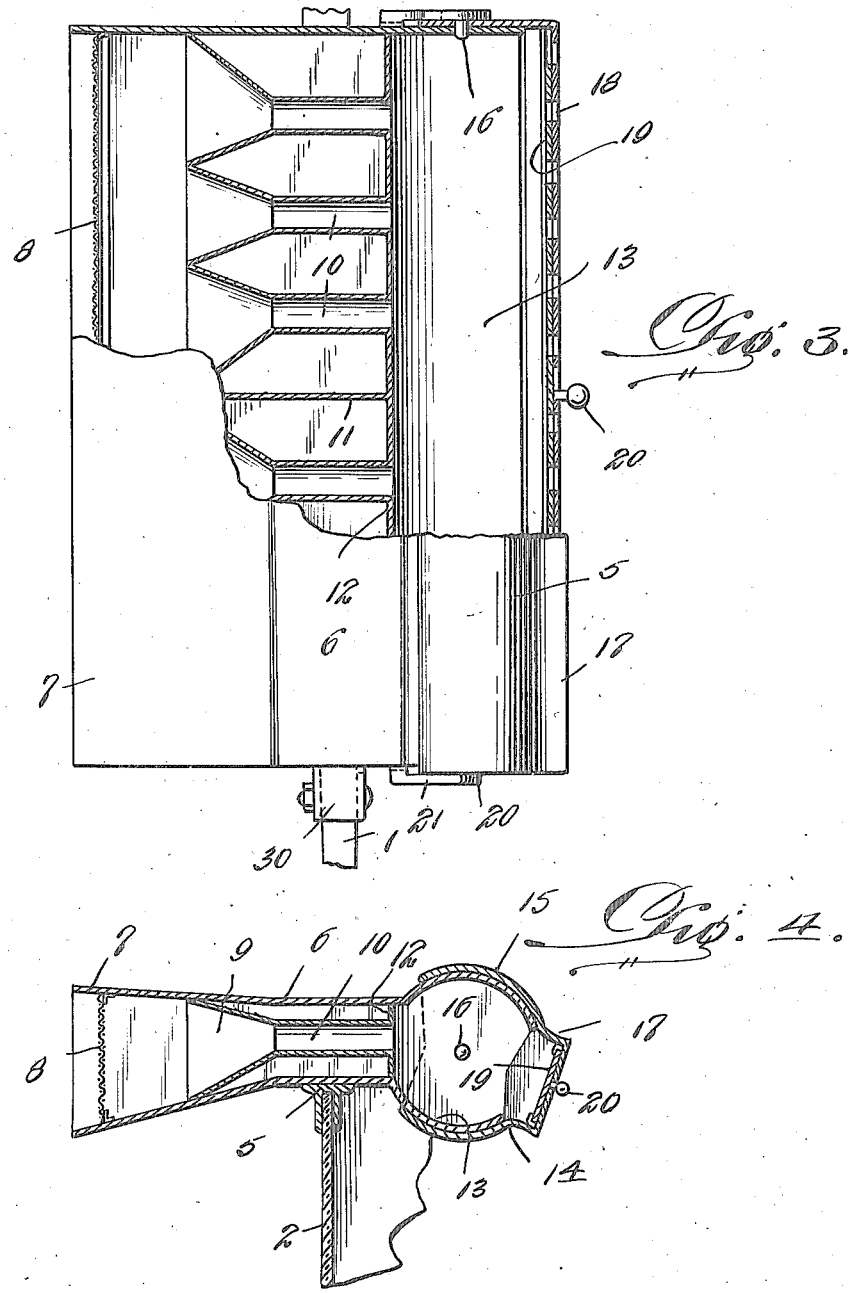

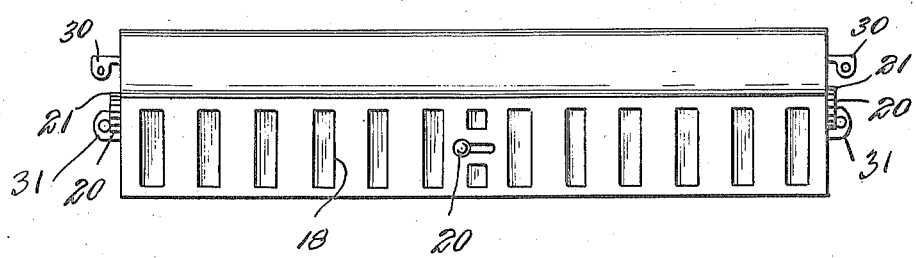
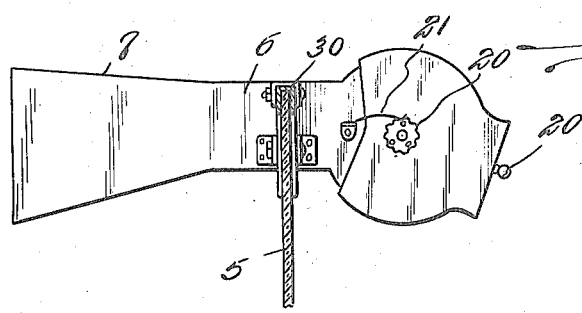
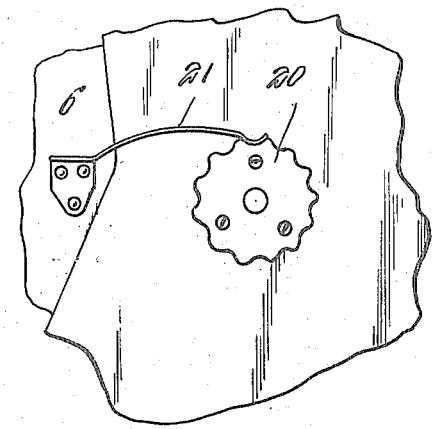

Patented Feb. 20, 1923.

1,445,732

UNITED STATES PATENT OFFICE.

GEORGE J. VONDRACEK, OF VERDIGRE, NEBRASKA.

VENTILATED AUTOMOBILE WINDSHIELD.

Application filed August 15, 1922. Serial No. 581,916.

*To all whom it may concern:*

Be it known that I, GEORGE J. VONDRACEK, a citizen of the United States, residing at Verdigre, in the county of Knox and State of Nebraska, have invented new and useful Improvements in Ventilated Automobile Windshields, of which the following is a specification.

One object of my said invention is the provision of a practically advantageous one piece wind shield characterized to lend increased stiffness and strength to the wind shield and at the same time to contribute to the desirable stream-line quality of an automobile.

Another object of the invention is the provision of a highly efficient adjustable ventilator in combination with a wind shield, the said ventilator being so relatively arranged as not to interfere with the vision of the driver, and being also located in such manner relative to the wind shield as to overhang the line of vision of the driver and in a measure protect the eyes of the driver from the sun.

Other objects and practical advantages of the invention will be fully understood from the following description and claims when the same are read in connection with the drawings, accompanying and forming part of this specification, in which:—

Figure 1 is a front elevation of a portion of an automobile equipped with the best practical embodiment of my invention of which I am cognizant.

Figure 2 is a side elevation of the same.

Figure 3 is a view, partly in top plan and partly in horizontal transverse section of my novel wind shield ventilator, the section being on the line 3—3 of Figure 2.

Figure 4 is a vertical section on the line 4—4 of Figure 1 of the ventilator.

Figure 5 is a rear elevation of the ventilator.

Figure 6 is a view showing the wind shield in section and the ventilator in end elevation.

Figure 7 is an enlarged detail end elevation illustrative of the means for adjustably fixing the ventilator discharge member about its axis.

Similar numerals of reference designate corresponding parts in all of the views of the drawings.

By particular reference to Figures 1 and 2 it will be noticed that my novel wind shield is in one piece of transparent glass, is arranged in an appropriate frame 1, and is made up of a transverse or front portion 2 and rearwardly directed rounded or curvilinear ends 3; the said rounded or curvilinear ends 3 being designed to lend increased stiffness and strength to the wind shield unit and to contribute to the desirable stream-line effect of an automobile, and at the same time to afford a largely increased vision for the driver and to tend to keep dust and dirt out of the tonneau 4.

In carrying out the second part of my invention which has to do with the ventilation of the wind shield and the supply of fresh air to the driver, I mount in a recess 5 in the upper central portion of the frame 1 and wind shield a hollow body or trunk 6 which extends forwardly and rearwardly of the wind shield and preferably has its forward portion 7 flared as illustrated. The said hollow body 6 may in common with other parts of my improvement be formed of sheet metal, appropriately embellished with a view to enhancing the finished appearance of the forward end of the automobile. In the forward portion or mouth of the hollow body 6 I employ a screen 8, designed to permit the free ingress of air while effectively excluding dust and dirt. In the hollow body 6 and in rear of and spaced from the screen 8 I employ a transverse series of tuyères, the said tuyères each including a forwardly flared mouth 9 and a comparatively contracted rear tubular portion 10. A brace 11 is preferably employed in the hollow body 6 between the sets of tuyères, as shown in Figure 3. This, however, is not of the essence of my invention, and hence the said brace 11 may be altogether omitted when deemed expedient without affecting my invention. The rear ends of the tuyère tubes 10 are fixed with respect to a wall 12 which in turn is fixed in the rear portion of the body 6. At its rear end the body 6 is merged into a cylindrical portion 13 which is provided at a point remote from the rear end of the body 6 with an opening 14. Mounted to rock on the said cylindrical portion 13 of the body 6 is an adjustable deflector 15, the said deflector 15 being pivoted at 16 to the ends of the cylindrical portion 13 so as to be capable of rocking about the cylindrical portion and being provided with a discharge conduit 17. Manifestly the driver of the automobile is enabled by reaching upwardly and grasping the conduit 17 to rock or turn the deflector 15 about the cylindrical body 13 so as to direct the incoming volume of cool air as desired. The discharge end of the conduit 17 is apertured as indicated by 18, and the said apertures 18 are designed to be controlled and opened to a greater or less extent through the medium of a similarly aperture slidable damper 19, said damper 19 being guided at the inner side of the end wall of the conduit 17 and being equipped with a handle 20. From this it follows that by manipulating the damper 19 the driver of the car can regulate the amount of incoming air or can entirely shut off the same.

The tuyères in the hollow body 6 and hereinbefore described serve the important purpose of lending increased impetus to the incoming air so that when the novel ventilator is in use the forward portion of the interior of the car will be maintained in a cool state, and this irrespective of whether the car is an open car or a closed car.

For the purpose of preventing casual movement of the deflector 15 on the cylindrical portion 13 of the body 6 I provide a toothed end disk 20 on and in fixed relation to the deflector 15, and I also provide the body 6 with a resilient detent 21, Figures 6 and 7. In virtue of this provision it will be manifest that casual turning of the deflector 15 will be effectively prevented, and yet when a little stress is applied to the said deflector 15 the cooperating toothed disk and detent 21 will not prevent turning of the deflector 15 on the cylindrical body portion 13.

By particular reference to Figures 1, 5 and 6 it will be apparent that the body of my novel ventilator is provided with end brackets 30 and 31 for attachment to the frame of the wind shield.

The ventilator comprised in my invention is preferably, though not necessarily, formed in part of aluminum.

It will be apparent from the foregoing that while adapted to be used on open automobiles, my improvement can also be used to excellent advantage on sedans and other closed types of automobiles.

When desired the cover may be provided to fit over the mouth of the ventilator body with a view to excluding rain. The said cover can be retained in working position by spring clips or other means, and when not in use the cover can be carried in tool box or in any other desired part of an automobile. This weather-excluding cover is not of the essence of my invention but is a mere adjunct, which may be used or altogether omitted, and I have therefore, deemed it unnecessary to illustrate the same.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. The combination with a one piece automobile wind shield and the frame thereof, said wind shield and frame having an upper central recess, of a ventilator comprising a body fixed in and fully occupying said recess and extending forwardly and rearwardly from the wind shield and frame, a screen arranged in the forward portion of said body, tuyères arranged in the body in rear of the screen and having forwardly flared mouths and rear contracted tubular portions, a cylindrical portion at the rear end of the body and having an opening remote from the body, and a deflector pivotally mounted on said cylindrical portion and having a rearwardly extending discharge conduit.

2. The combination with a one piece automobile wind shield and the frame thereof, said wind shield and frame having an upper central recess, of a ventilator comprising a body fixed in and fully occupying said recess and extending forwardly and rearwardly from the wind shield and frame, a screen arranged in the forward portion of said body, tuyères arranged in the body in rear of the screen and having forwardly flared mouths and rear contracted tubular portions, a cylindrical portions at the rear end of the body and having an opening remote from the body, and a deflector pivotally mounted on said cylindrical portion and having a rearwardly extending discharge conduit; the said deflector having a peripheral notched end disk, and the body being equipped with a resilient detent arranged to exert pressure against the periphery of said disk.

3. The combination with a one piece automobile wind shield and the frame thereof, said wind shield and frame having an upper central recess, of a ventilator comprising a body fixed in and fully occupying said recess and extending forwardly and rearwardly from the wind shield and frame, a screen arranged in the forward portion of said body, tuyères arranged in the body in rear of the screen and having forwadly flared mouths and rear contracted tubular portions, a cylindrical portion at the rear end of the body and having an opening remote from the body, and a deflector pivotally mounted on said cylindrical portion and having a rearwardly extending discharge conduit, an apertured wall at the rear end of said discharge conduit, and an apertured damper plate guided at the inner side of said apertured wall and provided with a handle.

4. The combination with a ventilator body having a cylindrical portion at one end and an opening in said cylindrical portion remote from the body, and a deflector mounted on the cylindrical portion to rotate about the same and having a discharge conduit adapted to be moved into and out of registration with the opening in the cylindrical portion.

5. The combination with a ventilator body having a cylindrical portion at one end and an opening in said cylindrical portion remote from the body, and a deflector mounted on the cylindrical portion to rotate about the same and having a discharge conduit adapted to be moved into and out of registration with the opening in the cylindrical portion, said discharge conduit being provided with a plurality of discharge apertures and a damper for cooperation therewith.

6. A ventilator comprising a body, a plurality of tuyères in the body and having comparatively large forward portions, a cylindrical portion at the rear end of the body and having a discharge opening, and a combined deflector, regulator and cut-off mounted to rotate about the cylindrical portion.

7. A ventilator comprising a body, a plurality of tuyères in the body and having comparatively large forward portions, a cylindrical portion at the rear end of the body and having a discharge opening, and a combined deflector, regulator and cut-off mounted to rotate about the cylindrical portion; the said deflector being provided with a notched disk, and the body being equipped with a resilient detent to cooperate with said disk in preventing casual turning of the deflector.

8. As a new article of manufacture, a one piece automobile wind shield having at its ends outwardly grooved and rearwardly directed portions, said one piece wind shield being mounted in a frame, and the wind shield and frame being provided in their upper central portions with a recess, in combination with a ventilator occupying said recess and connected to said frame and extending forwardly from the wind shield and frame.

In testimony whereof, I affix my signature.

GEORGE J. VONDRACEK.